Dec. 13, 1927.

T. A. BANNING, JR 1,652,514

SYSTEM AND APPARATUS FOR FEEDING AND METERING FUEL AND THE LIKE

Filed March 16, 1925    5 Sheets-Sheet 1

Inventor:
Thomas A. Banning Jr.

Dec. 13, 1927.

T. A. BANNING, JR

1,652,514

SYSTEM AND APPARATUS FOR FEEDING AND METERING FUEL AND THE LIKE

Filed March 16, 1925  5 Sheets-Sheet 2

Inventor:
Thomas A. Banning Jr.

T. A. BANNING, JR 1,652,514

SYSTEM AND APPARATUS FOR FEEDING AND METERING FUEL AND THE LIKE

Filed March 16, 1925     5 Sheets-Sheet 4

Inventor:
Thomas A. Banning Jr.
by
Attys

Dec. 13, 1927.
T. A. BANNING, JR
1,652,514
SYSTEM AND APPARATUS FOR FEEDING AND METERING FUEL AND THE LIKE
Filed March 16, 1925    5 Sheets-Sheet 5

Patented Dec. 13, 1927.

1,652,514

UNITED STATES PATENT OFFICE.

THOMAS A. BANNING, JR., OF CHICAGO, ILLINOIS.

SYSTEM AND APPARATUS FOR FEEDING AND METERING FUEL AND THE LIKE.

Application filed March 16, 1925. Serial No. 16,085.

This invention has to do with improvements in systems and apparatus for feeding and metering fuels such as gasoline, etc. The invention has reference particularly to improvements having to do especially with the feeding and metering of fuel for the internal combustion engines of automobiles, busses, trucks, etc.; although it will presently appear that the features of the invention are in no wise limited to the above or any other particular classes of service. Inasmuch, however, as the constructions herein disclosed have been devised with a particular view to the requirements of the above class of service, I have illustrated and will describe the same for the above application; but in so doing, I wish it clearly understood that I do not intend thereby to limit the scope or usefulness of the invention, except as I may do so in the claims.

One of the features of the invention has to do with the metering of the fuel as it is fed to the engine in such a way as to make it possible to establish a definite ratio between quantity fed and work performed, in other words, economy of operation. More particularly it is an object to meter the gasoline against road travel in such a manner as to give an indication of miles per gallon of fuel consumed.

A further object of the invention relates to the provision of an arrangement such that the indication of the ratio will be corrected periodically, for example, at the completion of each unit distance of road travel, as distinguished from an arrangement in which the indicated ratio varies from instant to instant according to the momentary rate of travel as compared to rate of fuel consumption. According to this feature of the present invention, I prefer to establish the corrected ratio at the completion of unit distances of road travel which are sufficiently large to establish a fairly average condition, and at the same time are sufficiently frequent to promptly show any material or abnormal change of the ratio which may take place due to some fairly continuing change in operating conditions. For example, in some cases a correction every half mile of road travel will be found satisfactory.

In connection with the above features, and as a simple means for accomplishing the desired result, it is a further object of the invention to commence each new unit of travel with a definite quantity of fuel, and to continue the operation for the entire unit distance of travel from such quantity of fuel, so that the amount of fuel remaining at the completion of the unit distance of travel will be a measure of the amount consumed and thus an indication of the desired ratio, and to indicate the desired ratio of miles per gallon based on the above system of operation. For example, if the correction is established every half mile and each new unit of travel is commenced with a measured quantity of one pint of gasoline, and one-half pint of gasoline is left unconsumed at the completion of a given unit of travel, the same will be evidence of the fact that one half pint was used to establish the unit distance of travel, which would be at the rate of eight miles per gallon, such ratio being then indicated to the driver.

Another feature of the invention in connection with the foregoing relates to the provision of means for establishing a perfectly continuous and uninterrupted delivery of fuel to the engine notwithstanding the periodic and regular metering operations. For this purpose a plurality of metering chambers may be used through which the fuel is taken in succession, suitable valve arrangements being provided for bringing them into operation according to a definite cycle or rotation.

Another feature of the invention relates to the provision of means for insuring a continuous and definite supply of fuel to the engine in case an abnormal quantity of fuel should be required to traverse a given unit distance of travel, in which case the economy would be abnormally low.

A further feature of the invention relates to the provision of means for drawing the fuel from a supply at a lower level to the metering and feeding device, use being made of suction created at a suitable source, as, for example, the intake manifold of the engine or the siphoning action of the circulating oil of the engine. This feature of the invention relates to the provision of a combined vacuum feeding and metering device suitable for raising the fuel from a lower to a higher level and delivering it to the engine, and at the same time metering it against road travel, as already explained.

A further feature of the invention relates to the provision of means for establishing a reserve supply of fuel adjacent to the position of the feeding and metering device, which reserve supply will remain available and unconsumed in case of the ordinary exhaustion of the fuel supply, and which reserve may be made immediately available at the control of the operator by the simple expedient of manipulating a valve from the dash board.

Another feature of the invention relates to the provision of means for insuring a continuous and definite supply of fuel to the engine if at any time the operating connection which is driven by the road travel of the vehicle should become broken or inoperative.

Another feature of the invention relates to the provision of means for giving a reading of the ratio at the dash board of the vehicle; and in this connection it is an object to make provision for insuring a correct reading notwithstanding any slant of the vehicle away from the horizontal condition due, for example, to ascending or descending a grade. In this connection, it is a further object to secure this result by the use of a suitable differential gauge at the dash board together with differential pressure connections reaching to the position of the metering chambers, so that the pressure due to gradient will be exerted equally on both sides of the indicating device and will thus be neutralized.

Other objects and uses of the invention will appear from a detailed description of the same, which consists in the features of construction and combinations of parts hereinafter described and claimed.

In carrying into effect the present invention I make provision for metering the amount of fuel used during a unit distance of road travel and I provide means for giving an indication of miles per gallon based thereon. As a simple means of metering the fuel, I have provided the structure illustrated in the drawings. The arrangement therein illustrated includes a chambered member 30 provided with three chambers 31, 32 and 33. This chambered member is conveniently formed from three sections including a central body 34, a bottom section 35 and a cap section 36. These may be made in any suitable manner, as, for example, by die casting operations.

Figure 1:
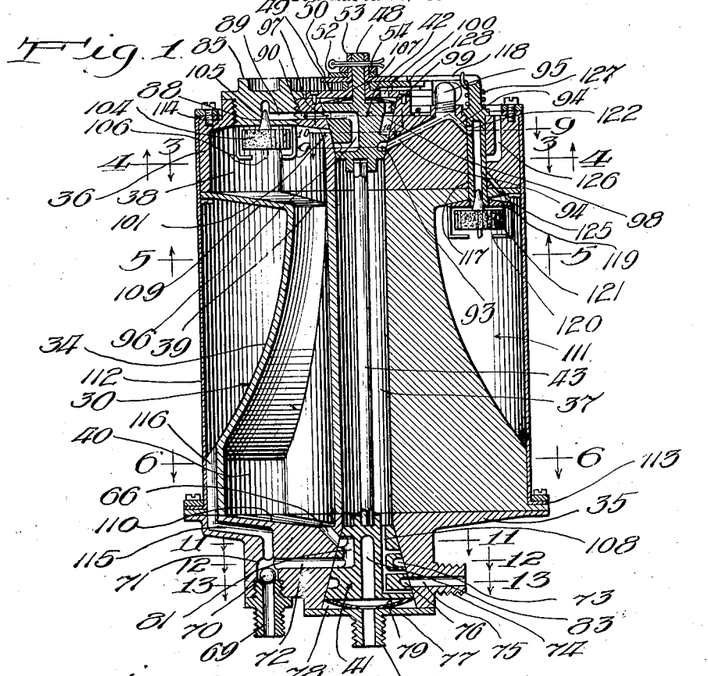
Figure 1 shows a vertical section through a device embodying the features of the present invention. It may also be considered as a section on the line 1—1, of Figs. 3, 4, 5 and 6, looking in the direction of the arrows.
Figure 11:
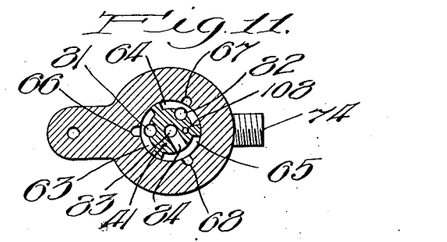
Figure 12:
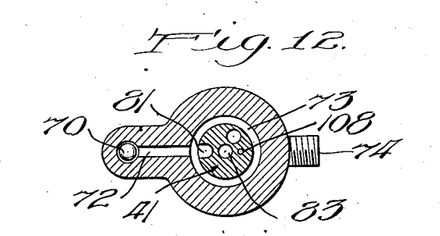
Figure 13:
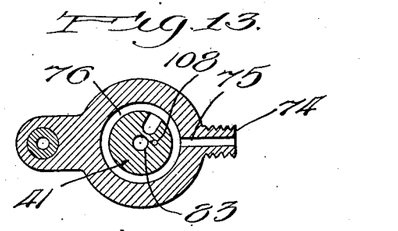
Figures 14, 15:
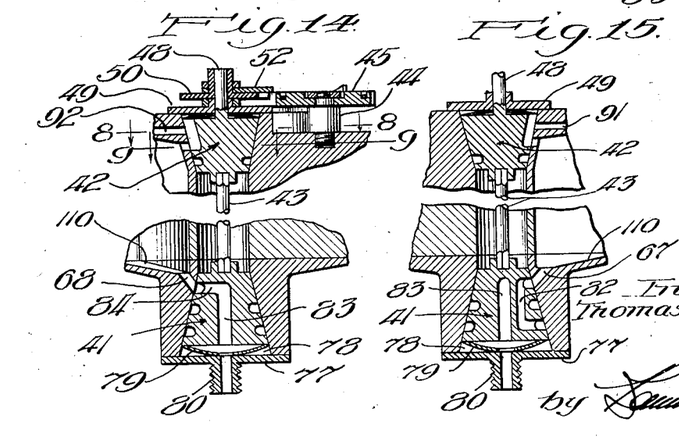
Fig. 14 is a fragmentary vertical section on the line 14—14 of Figs. 2, 3, 4, 5 and 6, looking in the direction of the arrows.
Fig. 15 is a fragmentary vertical section on the lines 15—15 of Figs. 2, 3, 4, 5 and 6, looking in the direction of the arrows.
Figure 16:
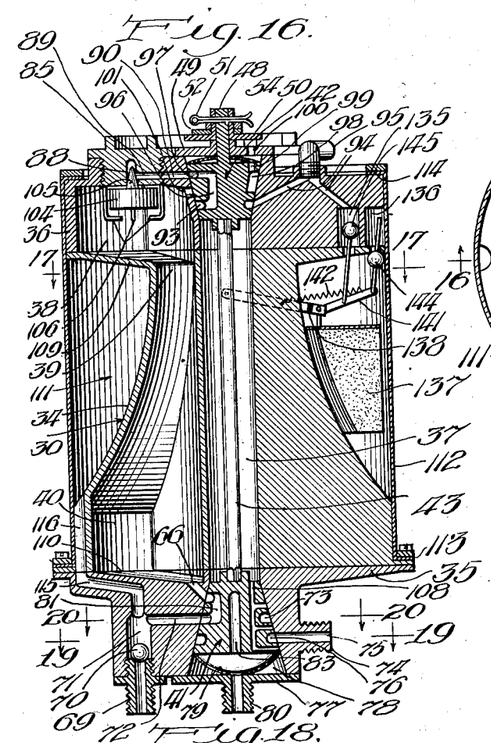
Fig. 16 is a view similar to that of Fig. 1, but illustrates a modified type of construction. It may also be considered as a section on the line 16—16 of Fig. 17, looking in the direction of the arrows.

There is preferably provided a central vertical passage 37 reaching down through the middle of the structure, as illustrated in Fig. 1. Examination of said figure in particular will also show that each of the chambers 31, 32 and 33 is of peculiar contour, having its upper portion 38 of full size, then contracting suddenly to a relatively narrow throat 39, and then widening out again on a peculiar curve to the bottom portion 40 which is also of full size. The exact form of the chambers is optional and in some cases it will be satisfactory to use chambers of uniform cross section. I will presently explain the purpose and desirability of the general form illustrated in Fig. 1. In the middle of the bottom section 35 is placed a radial plug valve 41 which controls the fuel passages, and in the middle of the cap section 36 is placed another plug valve 42 which controls the suction and vent passages. A stem 43 reaches vertically through the passage 37 and has its upper and lower ends non-circular and in engagement with suitable sockets in the top and bottom faces of the valves 41 and 42, respectively. Consequently, said valves are compelled to turn in exact unison.

Reaching up from the cap member 36 is a stud 44 upon which is journaled a worm wheel 45. Said worm wheel is driven by a worm 46 on the drive shaft 47. Said drive shaft in turn is driven in proportion to the road travel of the vehicle, or the travel of the engine, or the work performed, or any other variable which is being related to fuel consumption. In the case of an automotive vehicle, the shaft 47 may be driven by a side connection from the speedometer drive shaft or by a special driving connection from one of the road wheels or the propeller shaft or in any other convenient way.

Reaching up from the plug valve 42 is a stem 48, the same being journaled within a small plate 49 which is secured to the cap member 36. A ratchet wheel 50 is connected to said stem in any convenient manner as by a cotter pin 51. A rock arm 52 is swiveled on the stem 48 or the sleeve 53 of the ratchet wheel, a washer 54 preferably being placed immediately above the rock arm. A tooth 55 is placed on the bottom face of the rock arm in position to engage the ratchet wheel. A spring 56 normally restores the rock arm to the idle position indicated in Fig. 2, which is defined by the stop pin 57 reaching up from the cap 36.

Figure 7:
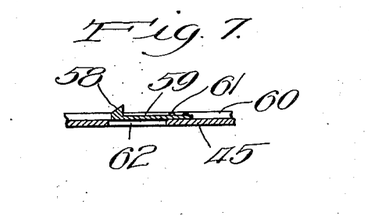
Fig. 7 is a fragmentary detail section on the line 7—7 of Fig. 2, looking in the direction of the arrows, and shows one of the latch hooks.

On the worm wheel 45 there are placed one or more lugs 58 of the general form shown in Fig. 7. The particular arrangement illustrated includes a spring finger 59 located within a circular slot 60 of the wheel 45 and held in place by one or more rivets 61 at that end of the spring arm 59 opposite to the lug 58. The wheel 45 is cut away at 62 beneath the free end of the arm 59, and the back side of the lug 58 is beveled, as shown in Fig. 7, so that in the case of backward movement of the wheel 45, said lug may ride beneath the rock arm 52 without damage to the parts.

Figure 2:
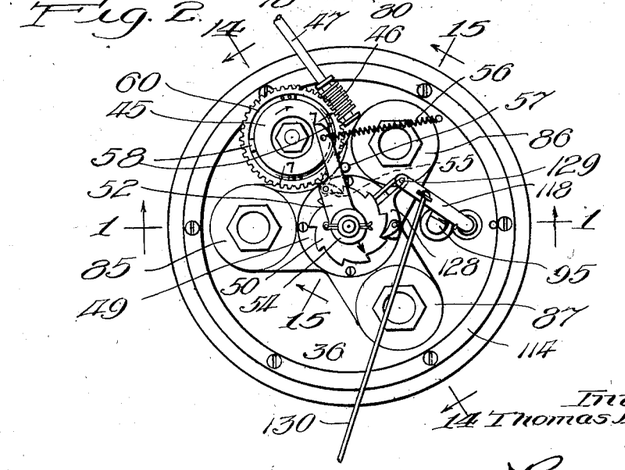
Fig. 2 shows a top plan view of the device of Fig. 1.
Figure 3:
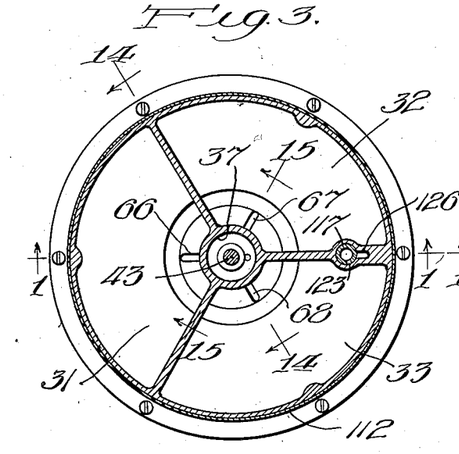
Figs. 3, 4, 5 and 6 are horizontal sections on the lines 3—3, 4—4, 5—5 and 6—6 of Fig. 1, looking in the direction of the arrows.
Figure 4:
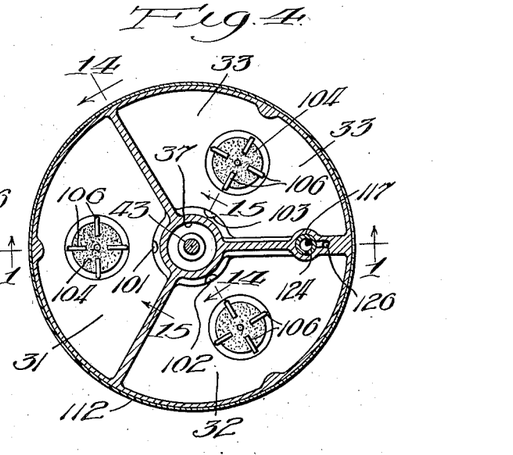
Figure 5:
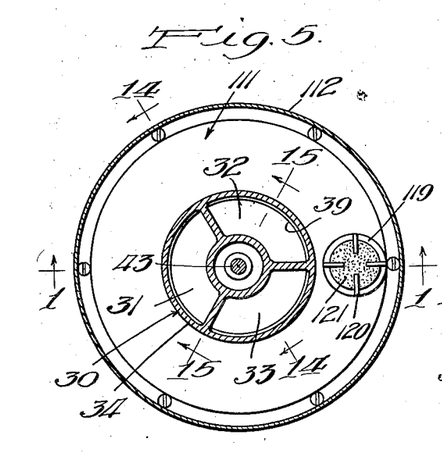
Figure 6:
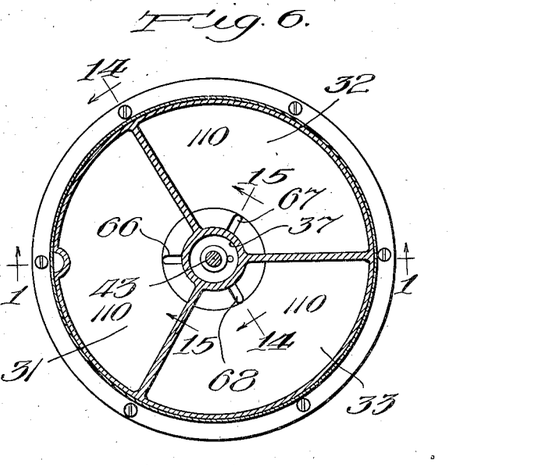

The rock arm 52 is of such length and the stop pin 57 is so positioned that when the wheel 45 turns in the direction of the arrow of Fig. 2, corresponding to forward travel of the vehicle, the abrupt face of the lug 58 will catch on the front side of the rock arm and gradually move it towards the left away from the stop pin 57, placing the spring 56 under tension. When the wheel 45 has completed approximately one-half revolution said lug will ride away from the rock arm and allow the same to be suddenly restored by the spring 56 thus suddenly turning the ratchet wheel and both valves the distance of one tooth.

Examination of Fig. 2 shows that the ratchet wheel is provided with nine teeth corresponding to three teeth for each of the three chambers 31, 32 and 33. Therefore, at the completion of every third swing of the rock arm, the valve system will produce a new grouping of the connections to the chambers.

The valve 41 is provided near its upper end with three segmental notches 63, 64 and 65 each being of slightly less than 120° circular arc. In the central inner corners of the three chambers there are the ports 66, 67 and 68 which lead down to the plane of the grooves 63, 64 and 65. The partitions between the grooves 63, 64 and 65 are slightly wider than the width of the ports just referred to, so that as the valve is turned cross connections between the chambers are avoided. Nevertheless, the parts are so proportioned that the connections of the chambers with the grooves 63, 64 and 65 will remain unaltered for each series of three consecutive swings of the rock arm 52.

At one side of the bottom plate 35 is a nipple 69 which receives fuel from the main supply tank. A ball check 70 preferably rests on the top of this nipple within a small chamber 71. This chamber communicates with a passage 72 which reaches inwardly to the valve 41 at a plane below the plane of the grooves 63, 64 and 65 and registers with another annular groove 73 in the surface of the valve. A fuel delivery nipple 74 reaches sidewise from the bottom plate 35 having a passage 75 at a plane below the passage 72 and in communication with another circular groove 76 which reaches around the valve 41. A bottom cap 77 is placed on the bottom plate 35 beneath the valve, but spaced away therefrom to establish a small chamber 78 within which is a light spring 79 which presses the valve upwards with a light pressure sufficient to keep the valve properly seated but without serious binding. A fuel delivery nipple 80 reaches down from the cap 77 and receives fuel from the chamber 78.

The groove 73 which is in line with the fuel supply passage 72 connects with the groove 63 by a vertical passage 81, the groove 76 which is in line with the indicator passage 75 communicates with the groove 64 by a vertical passage 82, and the bottom chamber 78 communicates with the groove 65 by a vertical passage 83 and side reach 84, as shown in Figs. 11 and 12.

From the above it is evident that for each position of the valve 41 one of the three chambers 31, 32 or 33 is connected to the fuel supply nipple 69, another chamber is connected to the fuel delivery nipple 80, and another chamber is connected to the indicator nipple 74. It will also be found that by turning the valve in the direction of the circular arrow in Fig. 2, being the clockwise direction, each chamber will be connected successively to the fuel supply nipple 69, then to the fuel delivery nipple 80, and then to the indicator nipple 74.

Figure 8:
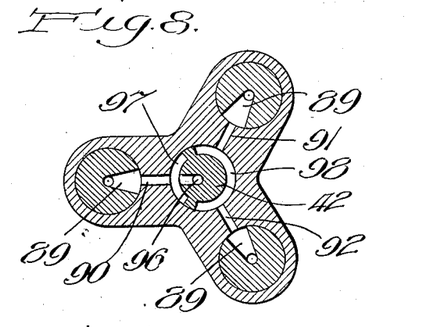
Figs. 8, 9, 10, 11, 12 and 13 are fragmentary horizontal sections on the corresponding lines of Fig. 1, looking in the direction of the arrows.
Figure 9:
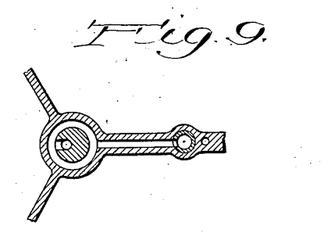
Figure 10:
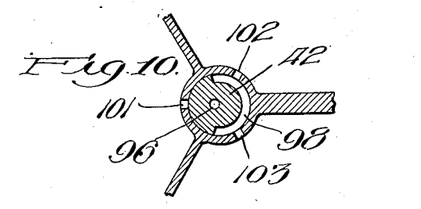

In the cap plate 36 and above the centers of the chambers 31, 32 and 33 there are located the plugs 85, 86 and 87 which may be threaded into place, as shown in Fig. 1. Each of these plugs has in its under face a tapered valve seat 88 communicating with a side passage 89 in the plug. These passages 89 are preferably of enlarged circular arc, as shown in Fig. 8, so that when the plugs are screwed up tight they will definitely meet with passages 90, 91 and 92 reaching inwardly toward the valve 42.

The lower portion of said valve 42 is provided with a circular groove 93 which also communicates with a passage 94 in one of the partitions of the cap 36; said passage 94 in turn connecting to the suction nipple 95 in the cap 36, which suction nipple is connected to the intake manifold or other source of suction.

The circular groove 93 communicates by a passage 96 with a segmental groove 97 in the upper portion of the valve 42, which segmental groove comes successively into communication with the passages 90, 91 and 92.

The back side of the valve 42 is cut away to establish a relatively large segmental groove 98 which also communicates with those two of the passages 90, 91 and 92 which are not at the time in communication with the groove 97. Furthermore, this large segmental passage 98 is vented by a hole 99 in the valve which communicates with another hole 100 in the plate 49.

It will be noted from examination of Fig. 1, that the circular groove 93 is placed low enough down to allow for the placing of vent openings 101, 102 and 103 above it and in the inner walls of the respective chambers 31, 32 and 33, and the large segmental groove 98 reaches down far enough to communicate with the vent openings 101, 102 and 103 of those two chambers which are not at the time connected to the suction nipple 95 through the medium of the segmental groove 97.

The two valves 41 and 42 are also so timed by the stem 43 that when the lower end of any chamber 31, 32 or 33 is connected to the fuel supply nipple 69, the upper end of said chamber is in position to receive suction, and the lower ends of both of the other chambers are connected respectively to the fuel delivery nipple 80 and the indicator nipple 74 and their upper ends are both vented.

A float 104 having a valve nipple 105 on its top face is placed beneath each of the plugs 85, 86 and 87, so that when the fuel rises practically to the top of the corresponding chamber the float will be raised and the port closed so as to shut off the suction and prevent fuel from being drawn over into the suction line. The downward movement of each of these float valves is limited by a series of fingers 106 reaching down from the corresponding plug 85, 86, or 87 and sustaining the valve in such a position as to insure proper registry of its nipple with the valve seat when the float is raised.

If desired, a small spring washer 107 may be placed immediately above the valve 42 so as to keep the same properly seated at all times without binding, but such washer, if used, should preferably be perforated, as shown in Fig. 1, to allow satisfactory venting.

It will be observed that both of the valves 41 and 42 are entirely contained within the lower plate 35 and the cap 36 respectively. Consequently, said valves can be easily ground into their seats, and any irregularities existing between the different sections of the device will be compensated for by the joints between the ends of the stem 43 and the respective valves.

If desired, the space 37 may be filled with a suitable lubricant such as castor oil in order to assist the lubrication of the valve 41 which controls the fuel. Ordinarily, this fuel will be gasoline, and inasmuch as the castor oil is substantially non-soluble therein, the same will provide an admirable lubricant.

In order to assist such lubricant in reaching the faces of the valve 41 between the positions of the various grooves therein, I have illustrated a hole 108 reaching down through the valve plug and communicating with a series of openings sidewise to the plug surfaces intermediate between the grooves.

It will be understood that each chamber 31, 32 or 33, as the case may be, is initially completely filled with fuel, practically to its roof as controlled by the corresponding float valve. It, therefore, contains substantially a definitely known amount of fuel. As fuel is subsequently drawn from such chamber the fuel level falls until the completion of the unit distance of road travel. This fact will be evident from the following statement. Assume a chamber of uniform cross-section throughout its height, and containing one pint of fuel, when full, and assume the correction is made every half-mile of road travel; then if said chamber is just emptied to traverse said one-half mile, the performance will be at the rate of four miles per gallon (one pint for one-half mile). This will establish the lowest reading as "four" for the bottom of the chamber. In case the chamber is only half emptied for traversing said one-half mile of travel the performance will be at the rate of eight miles per gallon (one-half pint for one-half mile). This will establish the middle reading as "eight" for the mid-height of the chamber. In case the chamber is only three-fourths emptied for traversing said one-half mile of travel the performance will be at the rate of five and one-third miles per gallon (three fourths pint for one-half mile). This will establish the reading for three-fourths depletion as "five and one-third" for the position one-fourth up from the bottom of the chamber. In case the chamber is only one-fourth emptied for traversing said one-half mile of travel the performance will be at the rate of sixteen miles per gallon (one-fourth pint for one-half mile). This will establish the reading for one-fourth depletion as "sixteen" for the position three-fourths up from the bottom of the chamber.

From the above we see that with a one-pint chamber of uniform cross-section throughout its height, and with corrections every one-half mile of travel, the bottom of the chamber would represent "four" miles per gallon, one-fourth up would represent "five and one-third" miles per gallon, one-half up would represent "eight" miles per gallon, three-fourths up would represent "sixteen" miles per gallon, seven-eighths up would represent "thirty-two" miles per gallon, etc., and the top would represent "infinity" miles per gallon, since it would mean that one-half mile was traversed on "no" gasoline. It is, therefore, evident that the ratio of miles per gallon represented by the fuel still remaining in the chamber is an inverse ratio, and that in the case of a chamber of uniform cross section throughout its height, a scale representing the ratio of miles per gallon would be very uneven, being closely crowded together at the high end and very widely separated at its low end. It is preferable to use a scale of uniform graduations throughout its normal working range. I have, therefore, illustrated the central portion 34 of the chamber structure as having the peculiar cross section illustrated in Fig. 1. The upper portion 38 of this chamber is of full size down to a point which represents substantially the best economy which will ever be encountered in normal service. For example, if each of the chambers is so proportioned that its upper portion 38 has a capacity of substantially one-third pint, and the correction is made every one-half mile, the vehicle would be giving an economy of twelve miles per gallon if the chambers were only emptied down to the point represented by the floors 109 of the upper enlargements 38. If the capacity of each chamber from its floor 109 down to the upper end of the lower enlarged section 40 is two-thirds of a pint the vehicle would be showing an economy of four miles per gallon if each chamber was always emptied down to that point. By suddenly contracting the cross sections of the chambers at the positions of the floors 109 to the throat 39 and then gradually enlarging their cross sections as indicated, down to the position of the upper end of the lower enlarged sections 40, it is possible to cause the level of liquid in the chamber to fall in such a varying rate (as compared to withdrawal of equal quantities of liquid) as to compensate for the irregular form of scale above explained, and thus it is possible to secure a uniform scale between readings of twelve miles and four miles per gallon.

The lower enlarged section 40 constitutes a reserve for each chamber which will ordinarily not be used at all, but which is available in case of emergency.

In case the same device just referred to is used with corrections at the end of each mile instead of each half mile of road travel, the uniform section of the scale will be established between readings of twenty-four and eight miles per gallon as is evident because the amount of road travel would be twice that for half mile corrections.

I prefer to slant the floors 109 inwardly, as shown in Fig. 1, on a sufficient angle to insure proper drainage of fuel from the upper enlarged portions 38 when climbing or descending the steepest grade which will probably be encountered, for example, 15%. For a similar reason, I also prefer to form the floors 110 of the lower enlarged sections 40 on a similar slant as indicated. Furthermore, by so doing it is possible to insure complete drainage of each of the chambers to the position of its ports 66, 67 or 68.

It will also be noted that the roof of each of the upper enlarged sections 38 tapers upwardly towards the position of the corresponding plug 85, 86 or 87, such taper being on a similar angle, and in order to reduce as much as possible the space which will be unfilled by fuel when the float valve seats.

Owing to the peculiar form of the chambered member 30 there is left an annular space 111 around the same of considerable volume. I place a cylindrical can 112 around this space, said can being provided with flanges 113 and 114 at its lower and upper ends respectively, whereby the space may be sealed to the lower and upper sections 35 and 36.

This space 111 is well adapted to establish a reserve of fuel available at the wish of the driver. For this purpose I provide a passage 115 in the lower section 35 extending between the chamber 71 and the passage 116 which leads upwardly at the side of the central section 30 and communicates with the chamber 111. This passage 115, therefore, is also in direct connection with the passage 72 but is protected by the ball check 70.

Extending through the cap member 36 and into the upper end of the chamber 111 is a tubular valve 117, the upper end of which is closed and is provided with a control lever 118. The lower end of this tubular valve carries a flange 119 having the fingers 120 which protect the float valve 121, said float valve being similar to the float valves 104, already referred to.

The tubular valve 117 normally stands in the position indicated in the various figures. It has a port 122 which normally communicates with the suction passage 94. It also has two other ports 123 and 124 which are properly positioned to register with the vent passages 125 and 126, respectively, when the valve 117 is turned through its maximum amount of throw. The vent passage 125 leads into the chamber 111 and the vent passage 126 leads to atmosphere.

The lever 118 normally stands in the position of Fig. 2, but when it is moved into a position straight across the cap member 36 so as to point directly to the center of the ratchet wheel, the port 122 is closed so as to cut off suction from the valve 117, but the ports 123 and 124 are not placed in connection with their respective vent passages until a further movement of the arm 118 past such position is effected. Upon moving said arm such further distance the vent connections are established so as to vent the upper end of the chamber 111.

A spring 127 is provided which normally throws the arm 118 back to the position of Fig. 2. It is thus evident that normally suction is applied within the valve 117 so as to insure that the chamber 111 will be filled up to the floating position of its valve 121. It will, moreover, be retained full at all times while suction continues and until the position of the valve 117 is altered. It is noted that this condition will continue notwithstanding the fact that the lower end of the chamber 111 also communicates with the particular one of the chambers 31, 32 or 33 which is at the time being filled. Consequently, as each one of said chambers 31, 32 and 33 is filled, the new fuel will be drawn directly from the nipple 69 and past the ball check 70, leaving the supply of fuel in the chamber 111 unchanged.

Upon turning the valve 117 the full distance, the upper end of the chamber 111 will be vented so as to release the fuel contained therein and allow it to feed directly to whichever one of the chambers 31, 32 or 33 is at the time to be filled.

If perchance it should be desired to advance the positions of the valves 41 and 42 manually, the same can be done in the following manner: A rock arm 128 is provided which is connected to the arm 118 by a pin and slot connection 129. The arm 118 is connected to the dash board by a control rod 130. The rock arm 128 has a pawl engaging the ratchet wheel 50. The spring 127 normally holds the arms 118 and 128 in the retracted position of Fig. 2, as limited by the pin and slot connection aforesaid.

Upon pulling the control rod 130 just far enough to point the arm 118 directly towards the ratchet wheel, said ratchet wheel will be advanced the distance of one tooth with corresponding advancement of the valves, but the valve 117 will not be turned far enough to vent the chamber 111. By successively advancing the valve system two or three notches a new grouping of chamber connections will be established. If it should be desired to vent the chamber 111 and release its fuel, it is only necessady to pull the rod 130 clear over until limited by the pin and slot connection at the other side of its movement.

As a matter of convenience, a handle 131 may be provided at the dash board for the rod 130, a plate 132 being provided with an intermediate notch 133 and the end catch 134. By pulling to the position of the notch 133, the valve is advanced one tooth without venting the chamber 111, whereas by pulling clear over behind the catch 134, the chamber 111 is also vented.

As previously explained, it is intended that the volume of fuel down to the upper end of the lower enlarged section 40 of each chamber should be sufficient to meet the most adverse conditions which will ordinarily be encountered in traveling a unit of distance; in case of very severe conditions a portion of the fuel within the lower enlarged section may also be used, but ordinarily each chamber will be sufficient to supply sufficient fuel for driving the unit distance under such adverse conditions as will be encountered.

If in any case the amount of fuel within a chamber is not sufficient to accomplish the above result, the driver may manually shift the valve system from the dash board, as already explained, and thus bring successive chambers into connection until finally the road travel is sufficient to cause the system to proceed to operate automatically.

In Figs. 16 to 20 inclusive, I have shown a modified form of construction in which the valve 117 is dispensed with and there is provided in place thereof a vacuum feeding system. In this case suction and vent chambers 135 and 136 are provided in the cap member 36, the chamber 136 being vented by a hole in the can 112. The passages 115 and 116 lead into the lower portion of the chamber 111, as in the previous construction.

Figure 17:
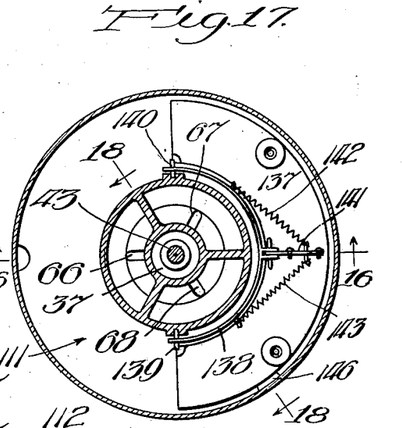
Fig. 17 is a horizontal section on the line 17—17 of Fig. 16, looking in the direction of the arrows.
Figure 18:
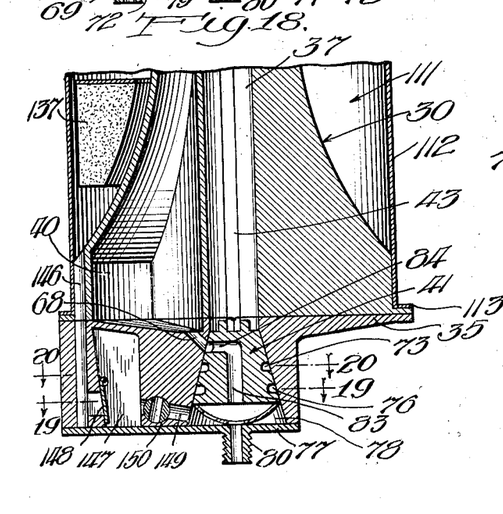
Fig. 18 is a fragmentary vertical section on the line 18—18 of Fig. 17, looking in the direction of the arrows.
Figure 19:
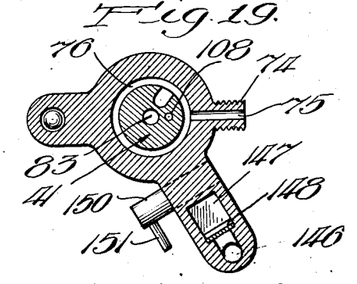
Figs. 19 and 20 are fragmentary horizontal sections on the lines 19—19 and 20—20 of Figs. 16 and 18, looking in the direction of the arrows.
Figure 20:
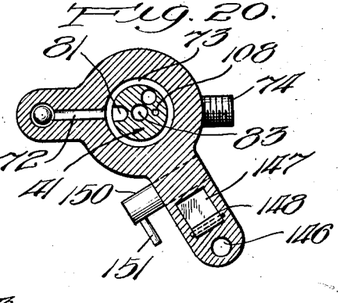

Within the chamber 111 is placed a curved float 137, and above the same is a curved arm 138 pivoted to the studs 139 and 140 at the opposite sides of the upper portion of the member 34, as indicated in Fig. 17. A link 141 is pivotally connected to the curved arm 138, and a pair of springs 142 and 143 are provided between said link and the curved arm. These springs are so positioned that they exert a toggle action between the link and the curved arm.

A ball valve 144 is connected to the outer end of the link 141 by a pin and works against the bottom of a port leading into the vent chamber 136. Another ball valve 145 is connected to the link 141 by another pin and works against the top side of a port leading into the suction chamber 135. When the float 137 is at its lowermost position the toggle is in the position indicated in Fig. 16. The upward pressure of the float causes the valve 144 to close the vent and the valve 145 to open the suction. A new charge of fuel is then drawn into the chamber 111 causing the float to rise. As a result, the relation between the link and curved arm will be modified until finally the toggle action is suddenly reversed. Thereupon the valve 145 will be drawn down to close the suction port and the valve 144 drawn down to open the vent. This will allow fuel to be delivered from the chamber 111.

At another side of the instrument from the position of the passages 115 and 116, preferably at 120° therefrom, I provide another passage 146 leading downwardly from the chamber 111 and communicating with another chamber 147 in the bottom section 35 under control of a flap valve 148. A port 149 leads from the chamber 147 to the space 78 beneath the valve 41, so that fuel can be directly delivered to the delivery nipple 80. A valve 150 is placed in the passage 149, said valve having a lever arm 151 which may be connected to the dash board by a rod, so that it can be conveniently manipulated by the driver.

With the above arrangement as long as the valve 150 remains closed the fuel will be compelled to be metered through the different chambers 31, 32 and 33 in succession in the normal manner. Upon opening the valve 150, however, a direct supply of fuel will be available from the chamber 111. Inasmuch as the space 78 beneath the valve 41 is also connected to one or the other of the chambers 31, 32 or 33 it follows that the fuel can surge up or down in said chamber while the float 137 operates up and down to draw in successive charges of fuel. Therefore, the device will continue to operate as a perfect vacuum feeding system.

Referring to Figs. 21, 22, 23 and 24, I have therein illustrated another modified type of construction in which there is a port 152 formed in the lower portion of each of the three partitions between the three chambers 31, 32 and 33. The floats 153, 154 and 155 are pivoted to the respective partitions by bell cranks, such as 156 shown in Fig. 2, valves 157 being connected to the free arms of said bell cranks to control the ports 152.

The float valve arrangements just explained are such that in case the fuel in any one of the chambers 31, 32 or 33 should be excessively depleted its float will fall thereby allowing its valve to open and receive fuel from the previous chamber of the series. Said previous chamber is always the one which is connected to the indicator and will in ordinary circumstances carry a considerable portion of fuel. This fuel will thus be made available to supplement the fuel of the chamber which is excessively depleted.

Figures 21, 22, 23, 24, 25, 26:
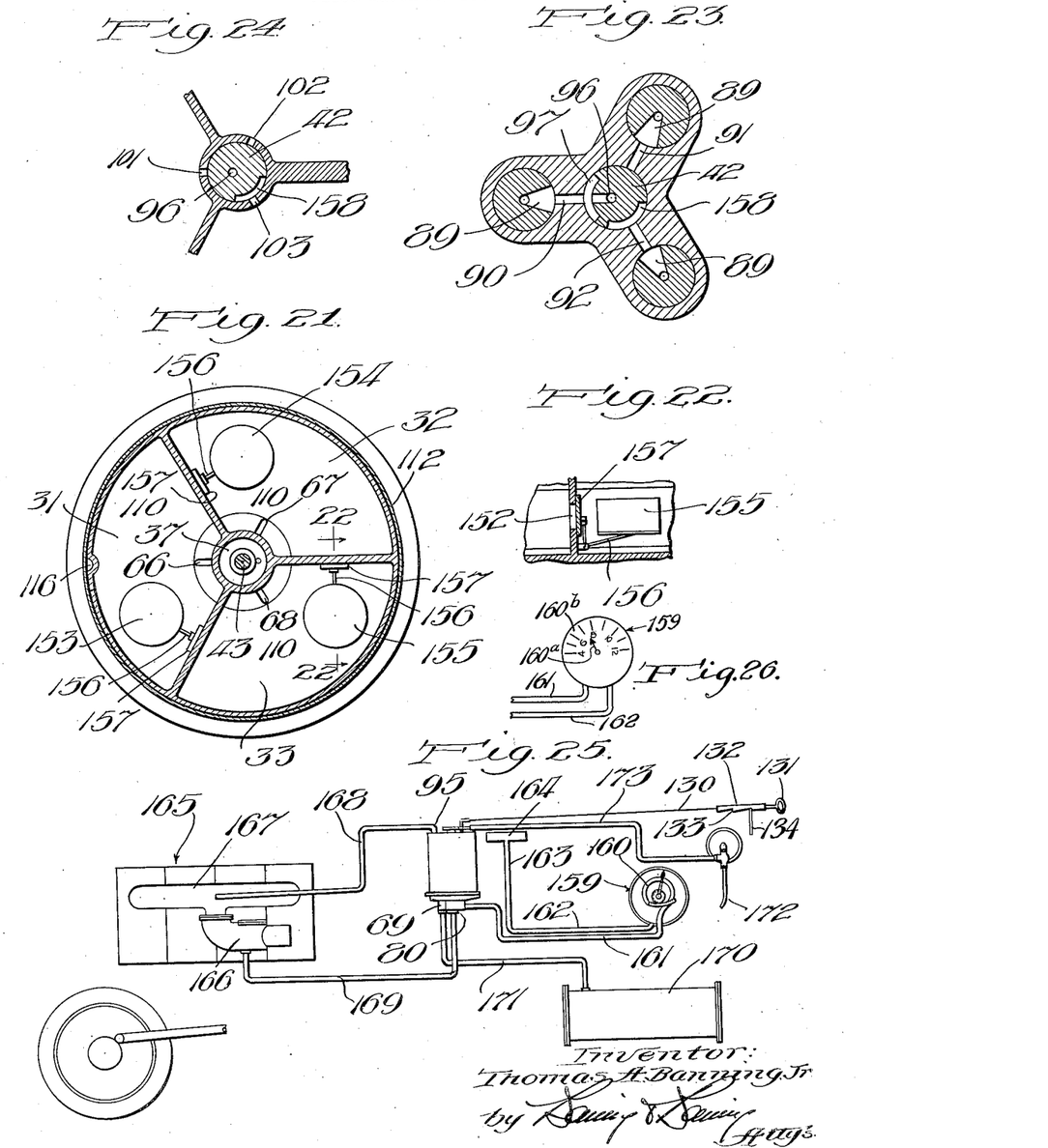
Fig. 21 is a view similar to that of Fig. 6, but illustrates a modified type of construction in which there are provided float valves between the consecutive chambers.
Fig. 22 is a fragmentary section on the line 22—22 of Fig. 21, looking in the direction of the arrows.
Figs. 23 and 24 are fragmentary horizontal sections corresponding to Figs. 8 and 10, respectively, but showing a modified construction suitable for use in connection with the arrangement of Figs. 21 and 22.
Fig. 25 shows diagrammatically an installation including the features of the present invention and Fig. 26 shows a front face view of the pressure gauge for giving a direct indication of miles per gallon at the dash board.

In order to insure that the depleted chamber will be refilled with fuel by suction when the valves 41 and 42 come around, both chambers must have their upper ends simultaneously sealed against vent. I have, therefore, illustrated in Figs. 23 and 24 modified valve constructions in which the valve 42 is modified to the extent that the vent groove 158 is made only broad enough to vent the particular chamber which is directly connected to the delivery nipple 80. This means that the chamber which is connected to the indicator is not directly vented. Accordingly, as supplemental fuel passes from the chamber, which is connected to the indicator, into the chamber which is directly connected to the delivery nipple, the air will necessarily vent up through the same opening 152 through which the fuel is trickling. By making these openings 152 rather deep, as indicated in Fig. 22, this result will be obtained.

In each of the constructions disclosed herein the amount of fuel remaining within a metering chamber is a measure of the amount removed therefrom, and, therefore, an inverse measure of the miles per gallon ratio. Any suitable means may be used for indicating to the driver the ratio based thereon, said means being preferably direct reading in miles per gallon and preferably having a uniform scale throughout the desired range.

Any suitable form of indicator may be used in connection with the chambers 31, 32 and 33, such as a pressure gauge, or a gauge glass. The only requirement in the forms illustrated herein is that the indicator be so arranged that it will operate according to the fluid pressure exerted at the indicator nipple 74 due to the height of the fluid within the proper chamber.

In ascending or descending a grade, the indicator at the dash board will be correspondingly lowered or raised with respect to the chambers 31, 32 or 33. In order to compensate for the above and to insure a correct reading under all conditions, recourse may be had to the arrangement shown diagrammatically in Figs. 25 and 26. In this case, however, I have shown a pressure gauge 159 having a Bourdon tube 160, which tube is connected with the indicator nipple 74 by a tube 161. The casing of the gauge is sealed and is connected by a tube 162 with a small stand pipe 163 adjacent to the position of the chambers 31, 32 and 33. This stand pipe has an enlarged head 164 at substantially the same elevation as the closed position of the float valves 104. By filling the casing of the gauge and the stand pipe 163 and tube 162 with liquid of the same specific gravity as that of the fuel, there will be a balancing pressure of proper static head to balance the erroneous condition which would otherwise be established. The enlargement 164 will allow for the necessary expansion and contraction of liquid in the compensating system due to temperature changes, and substantially without error. The Bourdon tube 160 is connected to the needle 160ª working over the scale 160ᵇ which is graduated to read directly in miles per gallon.

In Fig. 25 I have also shown diagrammatically one system of connecting up the device of the present invention. In this case the engine is shown diagrammatically at 165 with the carburetor 166 and intake manifold 167. The suction nipple 95 is connected to the intake manifold by the line 168, the delivery nipple 80 is connected to the carburetor at the line 169, the fuel supply nipple 69 is connected to the main tank 170 by the line 171, and the drive shaft 47 is connected to the speedometer drive shaft 172 by the flexible connection 173.

While I have herein shown and described only certain embodiments of the features of my present invention, still I do not intend to limit myself to the same, except as I may do so in the claims.

I claim:

1. The combination with a motor vehicle having an internal combustion engine and a fuel supply tank, of means for delivering fuel from the tank to the engine and metering the same against road travel including a chamber, a fuel valve for the lower end thereof, an air valve for the upper end thereof, means for moving said valves harmoniously with respect to each other and in proportion to road travel of the vehicle, a fuel supply connection from the tank to the fuel valve, a fuel delivery connection from the fuel valve to the internal combustion engine, an indicator, markings in conjunction therewith designating ratio of distance traveled with respect to quantity of fuel consumed, a connection from the fuel valve to said indicator, a suction connection from the internal combustion engine to the air valve, and vent passages in conjunction with the air valve, whereby as the valves are advanced in proportion to road travel, said chamber is successively connected with suction and fuel supply, then with vent and fuel delivery, and then with the indicator, substantially as described.

2. The combination with a motor vehicle having an internal combustion engine and a fuel supply tank, of means for delivering fuel from the tank to the engine and metering the same against road travel including a plurality of chambers, suitable fuel and air valves for said chambers, means for moving said valves harmoniously with respect to each other and in proportion to road travel of the vehicle, a fuel supply connection from the tank to the fuel valve, a fuel delivery connection from the fuel valve to the internal combustion engine, an indicator, markings in conjunction therewith designating ratio of distance travelled with respect to quantity of fuel consumed, a connection from the fuel valve to the indicator, a suction connection from the internal combustion engine to the air valve, and vent passages in conjunction with the air valve whereby as the valves are advanced in proportion to road travel each chamber is successively connected with suction and fuel supply, then with vent and fuel delivery, and then with the indicator, substantially as described.

3. The combination with a motor vehicle having an engine and a fuel supply tank, of means for delivering fuel from the tank to the engine and metering the same against road travel including a plurality of chambers of substantially even size, a fuel valve for said chambers, means for moving said valve in proportion to road travel of the vehicle, a fuel supply connection from the tank to the valve, a fuel delivery connection from the valve to the engine, an indicator, markings in conjunction therewith designating ratio of distance traveled with respect to quantity of fuel consumed, and means connecting the indicator and the chambers, whereby as the valve is advanced in proportion to road travel each chamber is successively connected with fuel supply, then with fuel delivery, and then with the indicator, substantially as described.

4. The combination with a motor vehicle having an engine and a fuel supply tank, of means for delivering fuel from the tank to the engine and metering the same against road travel including a chamber, a fuel valve therefor, means for moving said valve in proportion to road travel of the vehicle, a fuel supply connection from the tank to the valve, a fuel delivery connection from the valve to the engine, an indicator, markings in conjunction therewith designating ratio of distance traveled with respect to quantity of fuel consumed, and a connection from the fuel valve to the indicator, whereby as the valve is advanced in proportion to road travel said chamber is successively connected with fuel supply, then with fuel delivery, and then with the indicator, substantially as described.

5. The combination with a motor vehicle having an engine and a fuel supply tank, of metering means operative to meter fuel in comparison to road travel including a plurality of chambers of substantially even size, an indicator, markings in conjunction therewith designating ratio of distance traveled with respect to quantity of fuel consumed, means for completely filling each chamber, then connecting it to the engine, then causing the indicator to indicate according to quantity of fuel remaining in said chamber, and means for operating said means substantially in proportion to road travel of the vehicle, substantially as described.

6. The combination with a motor vehicle having an engine and a fuel supply tank, of means for metering the fuel and delivering it to the engine including three chambers. a valve centrally located with respect to the lower portions of said chambers, means for turning said valve regularly at the completion of unit distances of road travel, a fuel supply connection from the tank to the valve, a fuel delivery connection from the valve to the engine, an indicator, markings in conjunction therewith designating ratio of distance traveled as compared to fuel consumed, a connection from the valve to the indicator operable to cause the indicator to operate according to the fuel remaining in a chamber at the completion of a unit distance of road travel, and suitable passages in conjunction with the valve and chambers whereby as the valve is advanced each chamber is connected successively to fuel supply, then to deliver fuel to the engine, and then to the indicator, all of said chambers having their cross sectional areas of different sizes at different levels, increasing towards the bottom, whereby when each chamber is completely filled at the commencement of a unit distance of road travel, the markings of the indicator may be uniformly spaced for equal changes of the amount of indicated ratio when connected to said chamber, substantially as described.

7. The combination with a motor vehicle having an engine and a fuel supply tank, of means for metering the fuel and delivering it to the engine including three chambers, a valve centrally located with respect to the lower portions of said chambers, means for turning said valve regularly at the completion of unit distances of road travel, a fuel supply connection from the tank to the valve, a fuel delivery connection from the valve to the engine, an indicator, markings in conjunction therewith designating ratio of distance traveled as compared to fuel consumed, a connection from the valve to the indicator operable to cause the indicator to operate according to the fuel remaining in a chamber at the completion of a unit distance of road travel, and suitable passages in conjunction with the valve and chambers whereby as the valve is advanced each chamber is connected successively to fuel supply, then to deliver fuel to the engine, and then to the indicator, substantially as described.

8. The combination with a motor vehicle having an engine and a fuel supply tank, of means for metering the fuel and delivering it to the engine, including a plurality of chambers, a valve centrally located with respect to the lower portions of said chambers, means for turning said valve regularly at the completion of unit distances of road travel, a fuel supply connection from the tank to the valve, a fuel delivery connection from the valve to the engine, an indicator, means for causing the same to give successive indications according to amount of fuel remaining in the chambers after they are successively connected to the engine, and suitable passages in conjunction with the valve and chambers whereby as the valve is advanced each chamber is connected successively to fuel supply, and then to deliver fuel to the engine, substantially as described.

9. The combination with a motor vehicle having an engine and a fuel supply tank, of means for metering the fuel and delivering it to the engine including a chamber, a valve for the lower portion thereof, means for turning said valve regularly at the completion of unit distances of road travel, a fuel supply connection from the tank to the valve, a fuel delivery connection from the valve to the engine, an indicator, markings in conjunction therewith designating ratio of distance traveled as compared to fuel consumed, a connection from the valve to the indicator operable to cause the indicator to operate according to the fuel remaining in a chamber at the completion of a unit distance of road travel, and suitable passages in conjunction with the valve and chamber whereby as the valve is advanced said chamber is connected successively to fuel supply, then to deliver fuel to the engine, and then to the indicator, said chamber having its cross sectional areas of different sizes at different levels increasing towards the bottom, whereby when said chamber is completely filled at the commencement of a unit distance of road travel, the markings of the indicator may be uniformly spaced for equal changes of the amount of indicated ratio when connected to said chamber, substantially as described.

10. The combination with a motor vehicle having an engine and a fuel supply tank, of means for metering the fuel against road travel including a chamber, a valve therefor, connections from the fuel supply tank to the valve and from the valve to the engine, an indicator, markings in conjunction therewith designating ratio of distance traveled compared with quantity of fuel consumed, suitable passages in conjunction with the chamber and valve, whereby as the valve is turned the chamber is connected with the fuel supply tank to be completely filled, and afterwards with the engine to feed the same, and means in conjunction with the chamber and indicator for causing the indicator to indicate ratio of distance traveled compared to quantity of fuel consumed, operable to give equal changes of indicator reading for equal changes of ratio of distance travelled as compared to fuel consumed, substantially as described.

11. In a device of the class described, the combination of three chambers of substantially equal size and contour located about a common vertical axis, a valve centrally located adjacent to the lower portions thereof, a fuel supply connection leading to said valve, a fuel delivery connection leading from said valve, an indicator connection leading from said valve, and passages in conjunction with the valve and chambers whereby as the valve is advanced each chamber is connected successively to the fuel supply connection, then to the fuel delivery connection, and then to the indicator connection, substantially as described.

12. In a device of the class described, the combination of a plurality of chambers of substantially equal size and contour located about a common vertical axis, a valve centrally located with respect to all of said chambers, a fuel supply connection leading to said valve, a fuel delivery connection leading from said valve, and passages in conjunction with the valve and chambers, whereby as the valve is advanced each chamber is connected successively to the fuel supply connection, and then to the fuel delivery connection, substantially as described.

13. In a device of the class described, the combination of a plurality of chambers of substantially equal size and contour, a fuel valve located adjacent to the lower ends thereof, means for advancing said valve uniformly with unit distances of road travel, a fuel delivery connection adjacent to said valve, a fuel supply connection adjacent to said valve, passages in conjunction with the valve and chambers operative effectively to connect each chamber first to the fuel supply connection and then to the fuel delivery connection, an air valve adjacent to the upper ends of the chambers, a suction connection, passages in conjunction with the valve and upper ends of the chambers operative effectively to place each chamber first in connection with the suction connection and then to vent such chamber, means for causing both valves to advance harmoniously, and a float valve in each chamber operative effectively to close the suction connection thereto when said chamber is filled, together with means in conjunction with the device operative effectively to indicate according to the depletion of fuel from each chamber during a unit distance of travel, substantially as described.

14. The combination with a motor vehicle having an engine and a fuel supply tank, of a chamber, a connection from the fuel supply tank to the chamber, a connection from the chamber to the engine, a valve operative effectively to control the connection of said chamber first with the fuel supply tank and then with the engine, and means for advancing said valve step by step with unit distances of travel of the vehicle, substantially as described.

15. In a motor vehicle, the combination with the fuel supply tank and internal combustion engine having a suction manifold and a fuel supply connection, of a chamber for fuel, a suction connection thereto from the engine, a valve in said suction connection operative effectively to discontinue suction when the chamber is filled, means for thereafter delivering fuel to the engine exclusively from said chamber, and an indicator for showing the ratio of distance traveled compared to fuel consumed by the use of fuel remaining in said chamber, substantially as described.

16. In a motor vehicle, the combination with the fuel supply tank and internal combustion engine, of a chamber for fuel, means for completely filling said chamber with fuel, means for thereafter delivering fuel to the engine exclusively from said chamber and without replenishment during such delivering operation and an indicator for showing the ratio of distance travelled compared to fuel consumed by the use of the fuel remaining in said chamber, substantially as described.

17. The combination with a motor vehicle having an engine and fuel supply tank, of metering means operative to meter the fuel in comparison to road travel including a plurality of metering devices, connections from said devices to the engine for the supply of fuel to the engine, a selector valve in said connections intermediate between said devices and the engine and having passageways to permit delivery of fuel exclusively from each of said devices in turn, to the engine, and a common indicator in conjunction with said devices operative to show ratio of distance travelled compared to quantity of fuel consumed on the basis of amount of fuel metered by each of said devices in succession, substantially as described.

THOMAS A. BANNING, Jr.